US008644177B2

(12) United States Patent
Gammon

(10) Patent No.: US 8,644,177 B2
(45) Date of Patent: Feb. 4, 2014

(54) METHODS AND APPARATUS FOR USE IN CONTROLLING DATA TRAFFIC FOR A WIRELESS MOBILE TERMINAL USING A WIRELESS ACCESS POINT (AP)

(75) Inventor: Scott Peter Gammon, Waterloo (CA)

(73) Assignee: BlackBerry Limited, Waterloo (CA)

( * ) Notice: Subject to any disclaimer, the term of this patent is extended or adjusted under 35 U.S.C. 154(b) by 292 days.

(21) Appl. No.: 12/970,025

(22) Filed: Dec. 16, 2010

(65) Prior Publication Data

US 2012/0155396 A1    Jun. 21, 2012

(51) Int. Cl.
*H04J 1/16*    (2006.01)

(52) U.S. Cl.
USPC .............................. 370/252; 726/26; 726/23

(58) Field of Classification Search
USPC .......... 370/338, 329, 252; 726/3, 4, 5, 14, 21, 726/13, 26, 27, 28, 29
See application file for complete search history.

(56) References Cited

U.S. PATENT DOCUMENTS

| | | | |
|---|---|---|---|
| 6,657,981 B1 | 12/2003 | Lee et al. | |
| 6,789,203 B1 | 9/2004 | Belissent | |
| 7,085,289 B2 | 8/2006 | Cromer et al. | |
| 7,221,904 B1 | 5/2007 | Gavrilovich | |
| 7,286,511 B2 | 10/2007 | Zhong et al. | |
| 7,447,184 B1 * | 11/2008 | Kharvandikar et al. | 370/338 |
| 7,724,728 B2 | 5/2010 | Pullela et al. | |
| 8,055,256 B2 | 11/2011 | Rudowicz et al. | |
| 8,090,395 B2 | 1/2012 | Ngai et al. | |
| 2004/0250123 A1 | 12/2004 | Robert et al. | |
| 2006/0056391 A1 | 3/2006 | Rana et al. | |
| 2007/0030850 A1 | 2/2007 | Grosse | |
| 2007/0033650 A1 * | 2/2007 | Grosse et al. | 726/22 |
| 2007/0049323 A1 * | 3/2007 | Wang et al. | 455/525 |
| 2008/0101283 A1 | 5/2008 | Calhoun et al. | |
| 2009/0271864 A1 | 10/2009 | Dietrich et al. | |

FOREIGN PATENT DOCUMENTS

| | | |
|---|---|---|
| EP | 1061694 A2 | 12/2000 |
| EP | 1557982 A1 | 7/2005 |
| EP | 1758303 A1 | 2/2007 |
| WO | 2005018162 A1 | 2/2005 |

OTHER PUBLICATIONS

Van Beijnum, Iljitsch; "How To Get Rid Of Denial Of Service Attacks"; BGP expert; Aug. 2010(at least); pp. 1-7.
European Search Report & Written Opinion for EP patent application # 10195506.0, May 12, 2011.

* cited by examiner

*Primary Examiner* — Dady Chery
(74) *Attorney, Agent, or Firm* — Ridout & Maybee LLP

(57) ABSTRACT

Techniques for use in controlling data traffic in a wireless local area network (WLAN) which includes at least one access point (AP) are described. In one illustrative example, the terminal is associated with the AP and receives data traffic from a source device via the AP. The terminal identifies whether a processing requirement of the terminal for processing data traffic exceeds a predetermined threshold. In response to such identifying, the terminal produces a control message which includes a source address corresponding to the source device and a destination address corresponding to the terminal, and sends the control message to the AP. The control message is defined to instruct the AP to prohibit transmission of the data traffic originating from the source address and destined to the destination address. In one scenario, the control message further includes a time value indication, for instructing the AP to prohibit transmission of the data traffic only for a time period indicated by the time value indication.

21 Claims, 5 Drawing Sheets

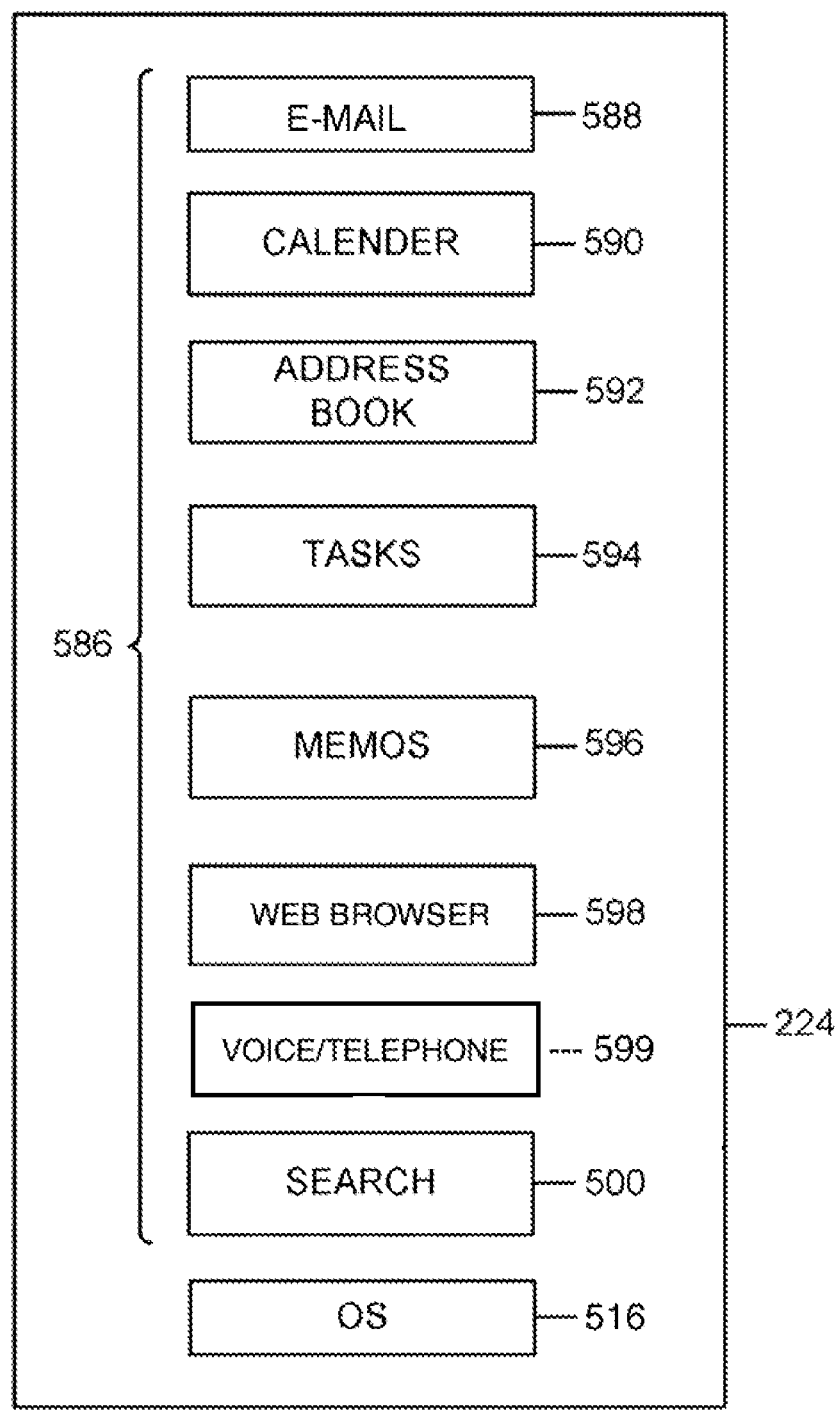

METHODS AND APPARATUS FOR USE IN CONTROLLING DATA TRAFFIC FOR A WIRELESS MOBILE TERMINAL USING A WIRELESS ACCESS POINT (AP)

BACKGROUND

1. Field of the Technology

The present disclosure relates generally to radio communications, and more particularly to techniques for controlling unwanted data traffic directed to a wireless mobile terminal in a wireless communication network.

2. Description of the Related Art

Wireless mobile terminals configured to operate in accordance with IEEE 802.11 standards or the like may communicate in wireless local area networks (WLANs). Such wireless mobile terminals are further configured to receive data formatted in IP data packets, for example, via a Web browser application, a Voice over IP (VoIP) application, or other.

Such wireless mobile terminals generally remain unprotected against incoming rogue IP data traffic in the WLAN, such as high data rate "pings" with large data packets, denial of service attacks, network misconfigurations, and/or other network errors. This undesired data traffic may cause excessive battery power drain and performance degradation in the wireless mobile terminal.

Other networks and environments may experience the same or similar problems. What are needed are methods and apparatus to overcome these and other related deficiencies of the prior art.

BRIEF DESCRIPTION OF THE DRAWINGS

Embodiments of present invention will now be described by way of example with reference to attached figures, wherein:

FIG. 5 is an illustrative representation of memory of the wireless mobile terminal which includes a plurality of applications, many of which require some form of data communications.

DETAILED DESCRIPTION OF THE PREFERRED EMBODIMENTS

Techniques for use in controlling data traffic in a wireless local area network (WLAN) which includes at least one access point (AP) are described. In one illustrative example, a wireless mobile terminal is associated with the AP and receives data traffic from a source device via the AP. The wireless mobile terminal identifies whether a processing requirement for processing data traffic exceeds a predetermined threshold. In response to such identifying, the wireless mobile terminal produces a control message which includes a source address corresponding to the source device and a destination address corresponding to the wireless mobile terminal, and sends the control message to the AP. The control message is defined to instruct the AP to prohibit transmission of the data traffic originating from the source address and destined to the destination address. In one particular embodiment, the control message also includes a time value indication, for instructing the AP to prohibit transmission of the of the data traffic for a time period indicated by the time value indication.

Figure 1:
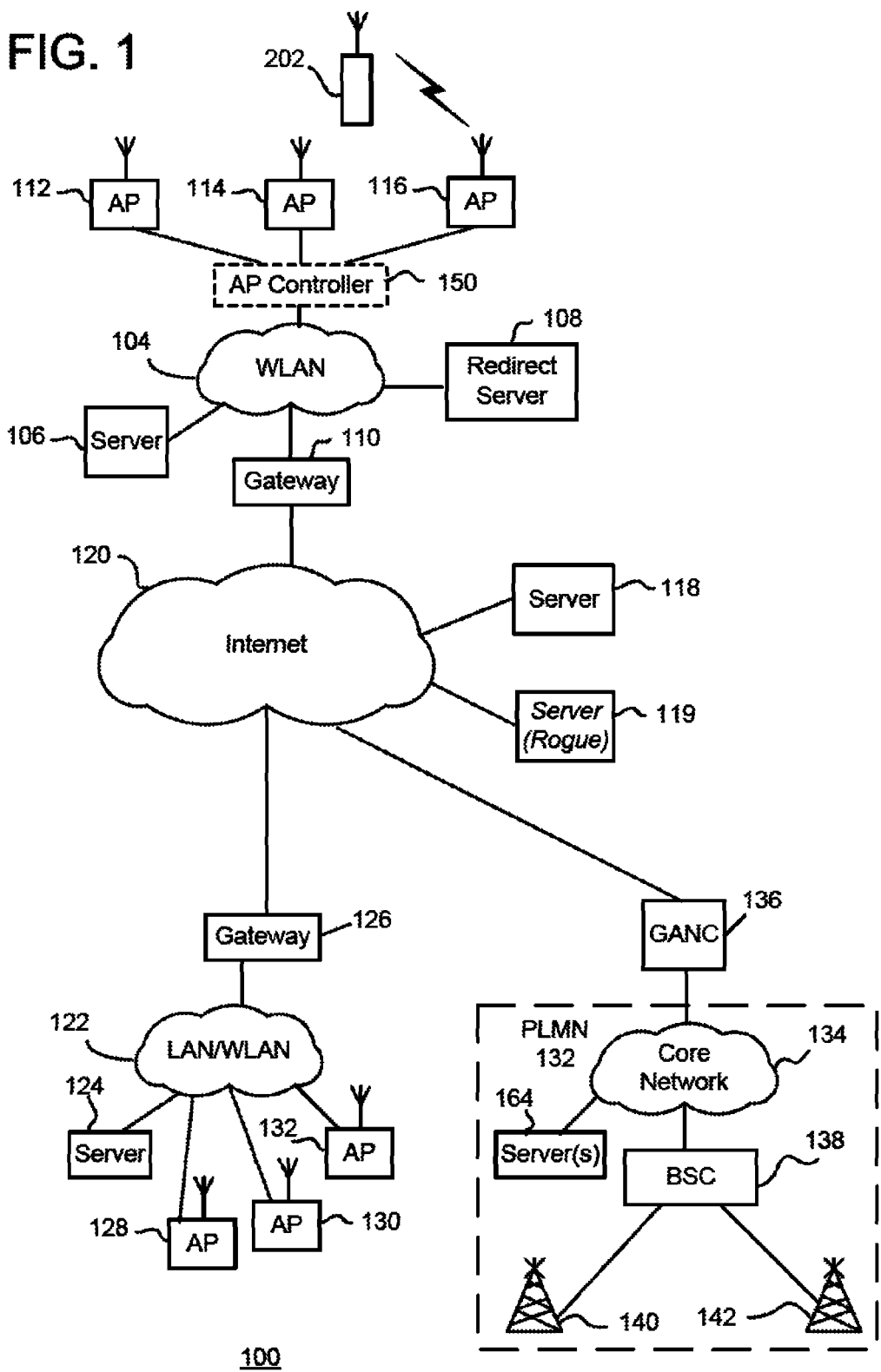
FIG. 1 is an illustrative representation of a communication system which includes a wireless communication network within which a communication device, such as a wireless mobile terminal, may operate.

To illustrate one exemplary network architecture within which the techniques of the present disclosure may be practiced, FIG. 1 is a communication system 100 which includes a wireless local area network (WLAN) 104 within which a wireless mobile terminal 202 (e.g. end station or "STA") may operate. WLAN 104 has a plurality of wireless access points (APs) 112, 114, and 116 for wireless communications with wireless mobile terminal 202. In the present embodiment, WLAN 104 and wireless mobile terminal 202 operate in accordance with IEEE 802.11 standards. Such WLANs are identifiable by a wireless mobile terminal 202 from a Set Service Identifier (SSID) or Extended SSID (ESSID). WLAN 104 also includes one or more servers 106, a redirect server 108, and a gateway 110. Server 106 may provide data, applications, and/or functionality for communication services in WLAN 104.

Wireless mobile terminal 202 may also operate for communications in different LANs/WLANs, such as WLAN 122. Similar to WLAN 104, WLAN 122 has a plurality of wireless APs 128, 130 and 132, one or more servers 124, and a gateway 126. In this embodiment, WLAN 122 is a private communication network of an enterprise (small company, corporation, etc.) associated with wireless mobile terminal 202. Such WLANs 104 and 122 may provide or allow access to various data and communication services to its terminals. For example, the WLANs may provide for access to Internet 120 via the Web browser application, or voice telephony communication services with use of Voice over IP (VoIP) communications or other techniques. Data traffic may be received by wireless mobile terminal 202 from servers 106 and 118, for example.

For "push-type" data or message synchronization services, wireless mobile terminal 202 is enabled to maintain data synchronization with a server (e.g. server 106 or 118) for user data of an application associated with a user account. The application of wireless mobile terminal 202 and the server may be or include, for example, an electronic mail (e-mail) application program for the communication of e-mail messages. In this case, the data synchronization is a message synchronization for the e-mail messages associated with the user account for an e-mail application program. The data synchronization may alternatively or additionally be or include an address book synchronization for address book contacts in an address book organizer, or a calendar appointment synchronization for calendar appointments in a calendar application program. These and other applications of wireless mobile terminal 202 are also identified later in relation to FIG. 5. For the data-synchronized communications, the server maintains storage of a mapping of a user account name or identifier of the user account with a personal identification number of wireless mobile terminal 202. When communications are required with wireless mobile terminal 202, the personal identification number is used to route the messages to/from wireless mobile terminal 202 through communication system 100.

In contrast to WLAN 122, WLAN 104 may be a public WiFi "hotspot" for public use and include what is referred to as a "captive portal" or "walled garden." For devices connected in WLAN 104 via one of wireless APs 112, 114, and 116, gateway 110 is configured to permit or deny access to the data, applications, and/or functionality, as well as to permit or deny external access outside of WLAN 104 to Internet 120. To do this, gateway 110 has a set of IP address filters which define a set of addresses that are permissible/impermissible, if any at all, for access by devices. Access by a device depends on whether or not a device has been authorized and what access rights are given upon authorization.

Typically, when a request by a device in WLAN 104 is made prior to proper authorization, gateway 110 is configured to redirect the request to redirect server 108. In response, redirect server 108 is configured to respond to wireless mobile terminal 202 to provide data for producing information (e.g. a Web page information) which is rendered in a visual display of wireless mobile terminal 202 via a Web browser application. The information may solicit a user response. For example, the information may solicit a user registration or login with user fields for entering a user name and/or password information. The user will enter a user response via the Web browser application, for example, which is sent by wireless mobile terminal 202 and received by gateway 110. Gateway 110 identifies whether the received user response is sufficient (e.g. whether the user name and password match prestored user name and password information, whether the user payment is accepted, whether the user acceptance is confirmed, etc.). If the user response is deemed sufficient, gateway 110 permits access to the data, applications, and/or functionality in or outside of WLAN 104.

Again, in contrast to WLAN 104, WLAN 122 may be a private communication network of an enterprise associated with wireless mobile terminal 202. For devices attempting to access WLAN 122 via Internet 120, gateway 126 is configured to permit or deny internal access to the data, applications, and/or functionality in WLAN 122. For. devices connected in WLAN 122 via one of wireless APs 128, 130, and 132, gateway 126 may be configured to permit or deny access to the data, applications, and/or functionality offered via WLAN 122 depending on whether or not a device has been authorized and what access rights are given upon authorization.

Communication may also be configured in accordance with Generic Access Network (GAN) standards. Using GAN based technologies, wireless mobile terminal 202 may also access communication services from a core network 134 of a Public Land Mobile Network (PLMN) 132 (e.g. cellular). GAN technology may provide, amongst other things, a voice communication service for wireless mobile terminal 202 via the WLAN hotspot. PLMN 132 includes a core network 136, a plurality of base station controllers such as a base station controller (BSC) 138 coupled to core network 136, and a plurality of base stations such as a base station (BS) 140 and a base station 142 coupled to associated BSCs 138. Core network 136, BSC 138, and BS 140 operate in a conventional fashion as well-documented. Other PLMNs in the environment have a similar or the same architecture as PLMN 132. Such environments may be referred to as cellular telecommunications networks.

Using GAN technologies, communications between WLAN 104 and core network 134 of PLMN 132 may be facilitated through a suitable connecting network such as a broadband, wide-area IP communication network (e.g. the Internet 120) or any suitable public or private wide area network. Gateway/controller or GAN controller (GANC) 136 is provided between the Internet 120 and core network 134 of PLMN 132 in order to facilitate access to core network 134 by terminals through alternative links (e.g. radio links wireless APs 112, 114, and 116) different than those conventional radio links offered in the PLMN 132 (e.g. radio links of base stations 140 and 142). Thus, wireless mobile terminal 202 may also access services of core network 134 of PLMN 132 via WLANs, such as WLAN 104, through use of a WLAN radio interface as opposed to a cellular telephony interface. For such communications, GANC 136 and wireless mobile terminal 202 are adapted to establish and maintain a (secure) tunnel connection between each other through the intervening networks.

As will be described in more detail later below, techniques of the present disclosure may be implemented in both the wireless mobile terminal 202 and the wireless AP 116. Note that at least some of the wireless APs in WLAN 104, such as wireless APs 112, 114, and 116, may be connected to WLAN 104 through a network entity which may be referred to as an AP controller 150. In this case, AP controller 150 may perform the techniques of the present disclosure instead of the AP itself. APs 112, 114, and 116 may include processing logic other than radio functionality, but the extent of such logic is governed by the medium access control (MAC) architecture of the AP. In this regard, there are different types of APs. For one, "thick APs" (i.e. local MAC implementations) perform all necessary data processing and relaying locally (i.e. within the AP). On the other hand, "thin APs" (i.e. or remote MAC implementations) typically include only physical (radio) layer processes, and communicate via a proprietary protocol with the AP controller. Here, the AP's 802.11 MAC layer is implemented on the AP controller, so all frames sent by the AP are processed by the AP controller and forwarded on as if the MAC layer in the AP controller was that of the AP. Finally, "fit APs" have gained popularity in recent years, as they combine both the intelligence of a local MAC implementation with the agility of a remote MAC implementation, by splitting real-time and non-real-time functionality between the AP and the AP controller.

AP controller 150 is configured to manage and configure APs in WLAN 104, and may also serve as a router. In one centralized architecture embodiment, one or more AP controllers (e.g. AP controller 150) manage a set number of deployed APs. The APs retrieve configuration from their AP controller, and report their status back to the AP controller for management purposes. In a typical usage case, data from an AP is tunneled back to its AP controller for processing, and sent onto the back haul network. Here, the AP controller serves as a router, receiving and processing layer-2 frames and switching layer frames onto the access network. The AP controller may also provide Simple Network Management Protocol (SNMP) data regarding its associated APs, or other types of monitoring information, such as graphs of traffic data, or numbers of associated users.

Figure 2:
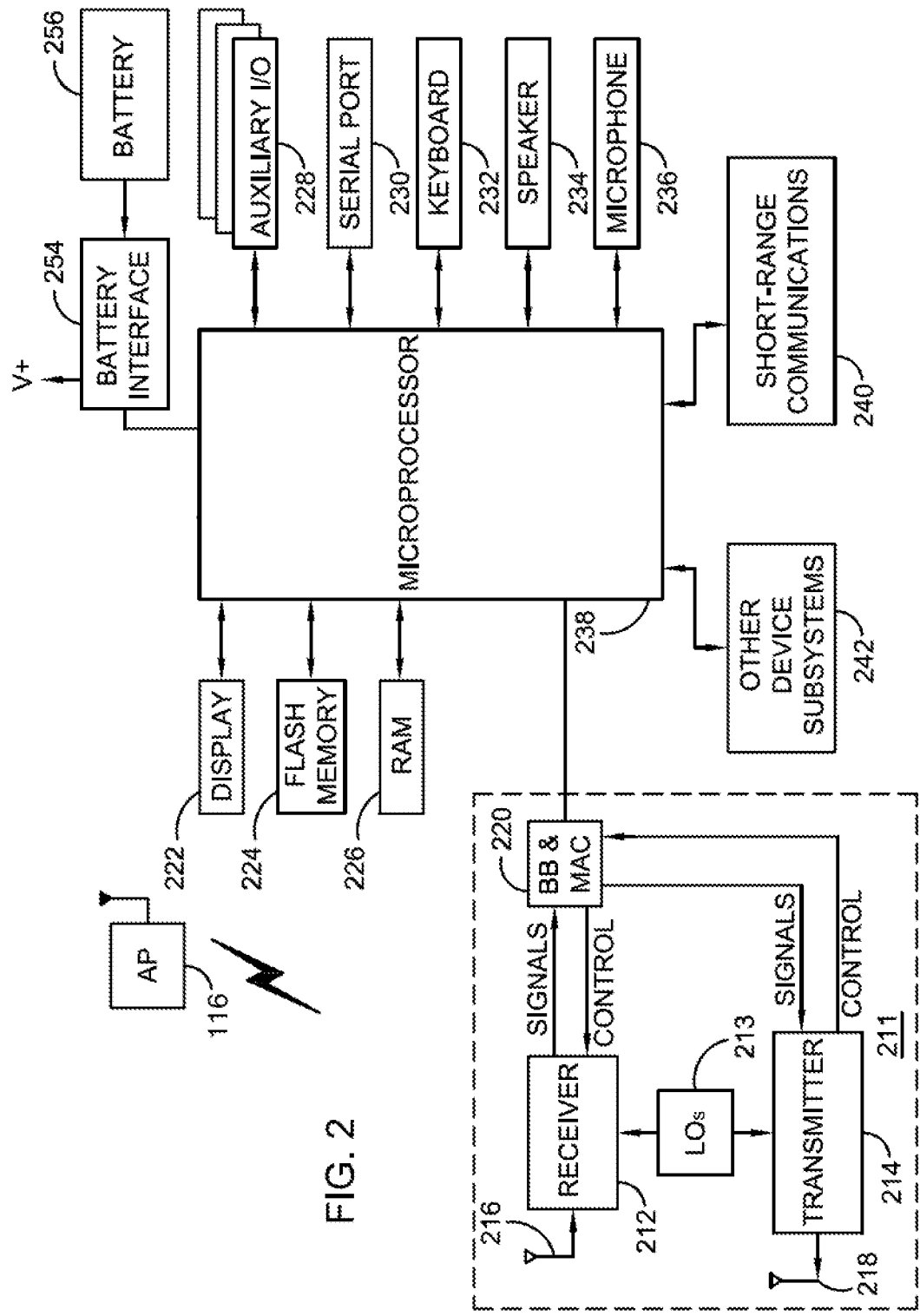
FIG. 2 is a schematic block diagram of a particular type of wireless mobile terminal.

Referring now to FIG. 2, electrical components of a typical wireless mobile terminal 202 (e.g. a mobile station, an end station or "STA", or user equipment "UE", or the like) which operates with wireless APs of communication system 100 of FIG. 1 will be described. Wireless mobile terminal 202 may be representative of one or more terminals shown and described in relation to FIG. 1. Wireless mobile terminal 202 may be a two-way communication device having at least voice and/or advanced data communication capabilities, including the capability to communicate with other computer systems. Also, wireless mobile terminal 202 may be a wireless communication device which operates in accordance with an IEEE 802.11 standards. Depending on the functionality provided by wireless mobile terminal 202, it may be referred to as a data messaging device, a two-way pager, a cellular-type telephone with data messaging capabilities, a wireless Internet appliance, or a data communication device (with or without telephony capabilities).

As shown in FIG. 2, wireless mobile terminal 202 is adapted to wirelessly communicate with wireless APs of WLANs, such as AP 116 of WLAN 104 of FIG. 1. For communication with AP 116, wireless mobile terminal 202 utilizes a communication subsystem 211. Depending on the type of device, wireless mobile terminal 202 may also be adapted to wirelessly communicate with other systems such as cellular telecommunication systems. With such configuration, wireless mobile terminal 202 may be referred to as a "dual mode" terminal. Although wireless mobile terminal 202 may have separate and independent subsystems for these purposes, at least some portions or components of these otherwise different subsystems may be shared where possible.

Communication subsystem 211 includes a receiver 212, a transmitter 214, and associated components, such as one or more (e.g. embedded or internal) antenna elements 216 and 218, local oscillators (LOs) 213, and a processing module such as a baseband (BB) and media access control (MAC) processing module 220. Communication subsystem may be or referred to as a radio frequency (RF) transceiver or wireless transceiver. As will be apparent to those skilled in the field of communications, the particular design of communication subsystem 211 depends on the communication network in which wireless mobile terminal 202 is intended to operate. In the present disclosure, communication subsystem 211 (including its associated processor/processing components) are operative in accordance with IEEE 802.11 standards.

Wireless mobile terminal 202 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in BB/MAC processing module 220. In a similar manner, signals to be transmitted are processed, including modulation and encoding, for example, by BB/MAC processing module 220. These processed signals are input to transmitter 214 for digital-to-analog (D/A) conversion, frequency up conversion, filtering, amplification and transmission through the network via antenna 218. BB/MAC processing module 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Since wireless mobile terminal 202 may be a handheld portable battery-powered device, it also includes a battery interface 254 for receiving one or more rechargeable batteries 256. Such a battery 256 provides electrical power to most if not all electrical circuitry in wireless mobile terminal 202, and battery interface 254 provides for a mechanical and electrical connection for it. Battery interface 254 is coupled to a regulator (not shown in FIG. 2) that provides a regulated voltage V to all of the circuitry.

Wireless mobile terminal 202 includes a microprocessor 238 (one type of processor or controller) that controls overall operation of wireless mobile terminal 202. This control includes the communication techniques of the present disclosure. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a (short-range) communication subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Keyboard 232 may be a complete alphanumeric keyboard and/or telephone-type keypad. On the other hand, keyboard 232 and display 222 may be replaced or enhanced with a touch screen display or other suitable input mechanism, or replaced or enhanced with a voice-activated input module.

Operating system software used by microprocessor 238 may be stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226. Microprocessor 238, in addition to its operating system functions, enables execution of software applications on wireless mobile terminal 202. A predetermined set of applications that control basic device operations, including data and/or voice communication applications, will normally be installed on wireless mobile terminal 202 during its manufacture. This includes applications or modules which are configured to perform the network selection techniques of the present disclosure. For this reason, microprocessor 238 (and any other processor(s) or modules of wireless mobile terminal 202) may enable execution of particular applications or modules for performing enhanced network selection techniques for access to multiple aggregator services.

Another application that may be loaded onto wireless mobile terminal 202 may be a personal information manager (PIM) application having the ability to organize and manage data items relating to user such as, but not limited to, e-mail, calendar events, voice mails, appointments, and task items. The PIM application has the ability to send and receive data items via the wireless network. In one embodiment, PIM data items are seamlessly integrated, synchronized, and updated via the wireless network, with the wireless device user's corresponding data items stored and/or associated with a host computer system thereby creating a mirrored host computer on wireless mobile terminal 202 with respect to such items. This is especially advantageous where the host computer system is the wireless device user's office computer system. Additional applications may also be loaded onto wireless mobile terminal 202 through network, an auxiliary I/O subsystem 228, serial port 230, (short-range) communication subsystem 240, or any other suitable subsystem 242, and installed by a user in RAM 226 or a non-volatile store (not shown) for execution by microprocessor 238. Such flexibility in application installation increases the functionality of wireless mobile terminal 202 and may provide enhanced on-device functions, communication-related functions, or both. For example, secure communication applications may enable electronic commerce functions and other such financial transactions to be performed using wireless mobile terminal 202.

In a data communication mode, a received signal such as a text message, an e-mail message, or web page download will be processed by communication subsystem 211 and input to microprocessor 238. Microprocessor 238 may further process the signal for output to display 222 or alternatively to auxiliary I/O device 228. A user of wireless mobile terminal 202 may also compose data items, for example, using keyboard 232 in conjunction with display 222 and possibly auxiliary I/O device 228. The composed items may be transmitted over a communication network through communication subsystem 211.

For voice communications, the overall operation of wireless mobile terminal 202 is substantially similar, except that the received signals would be output to speaker 234 and signals for transmission would be generated by microphone 236. Alternative voice or audio I/O subsystems, such as a voice message recording subsystem, may also be implemented on wireless mobile terminal 202. Although voice or audio signal output may be accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of wireless mobile terminal 202 by providing for information or software downloads to wireless mobile terminal 202 other than through a wireless communication network. The alternate download path may, for example, be used to load an encryption key onto wireless mobile terminal 202 through a direct and thus reliable and trusted connection to thereby provide secure device communication.

Short-range communications subsystem 240 of FIG. 2 is an additional component that provides for communication between wireless mobile terminal 202 and different systems or devices, which need not necessarily be similar devices. In this embodiment, communication subsystem 240 is a BLUETOOTH® communication module to provide for communication with similarly enabled systems and devices. Note that the BLUETOOTH® standards may be defined by or based on BLUETOOTH® Specification Version 2.0, Volumes 1 and 2, for example.

Figure 4:
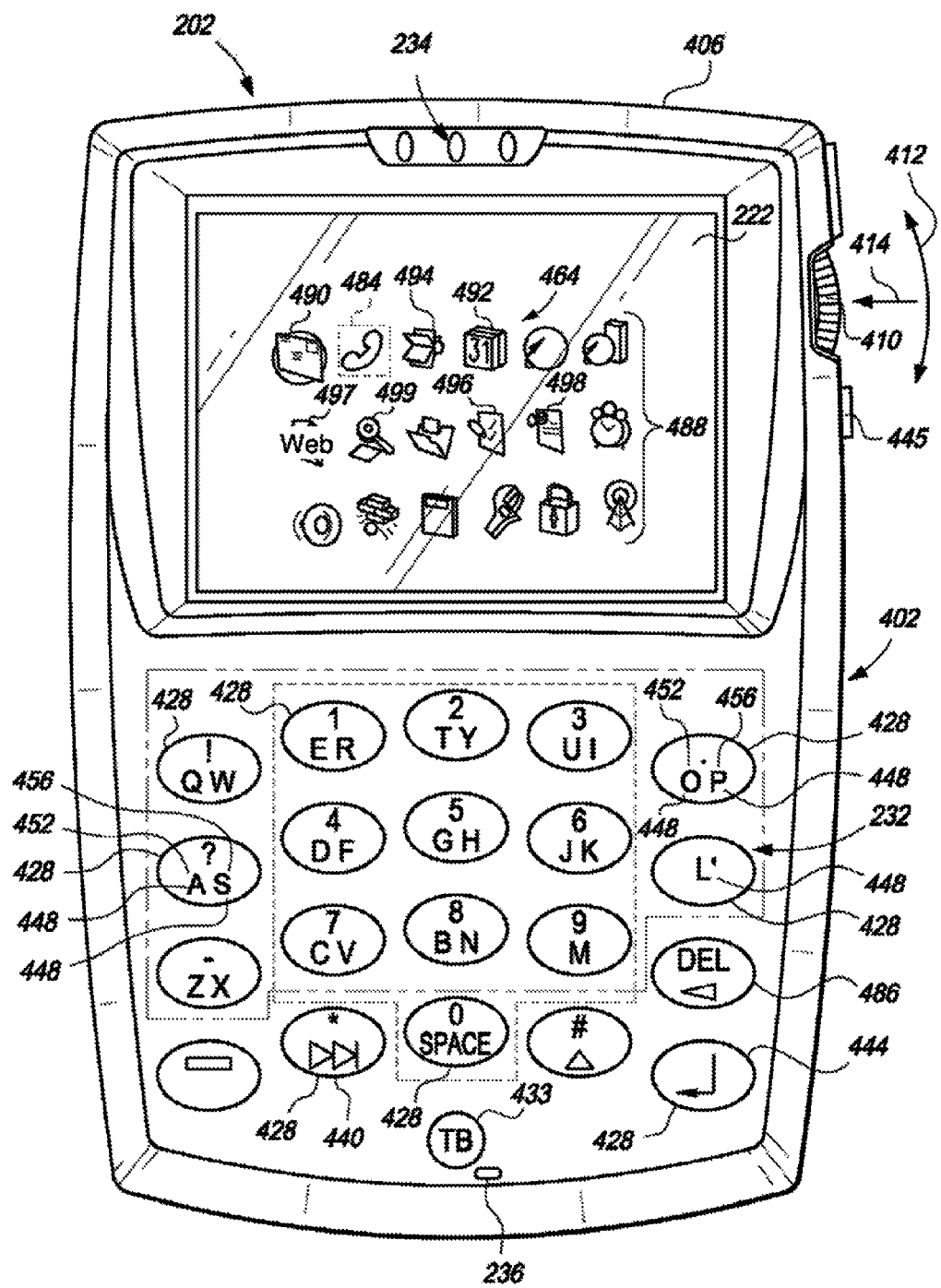
FIG. 4 is an illustrative example of an exemplary user interface of the wireless mobile terminal of FIGS. 1, 2, and 3.

Referring ahead to FIG. 4, which is shown is an illustrative representation of an exemplary user interface 402 of a communication device (wireless mobile terminal 202 of FIGS. 1 and 2). Wireless mobile terminal 202 includes at least display 222, keyboard 232, speaker 234, microphone 236, and a cursor or view positioning mechanism such as a positioning wheel 410 (e.g. a scrollwheel) or a trackball 433. Although shown enlarged in FIG. 4 for clarity, this mobile communication device 202 is sized to be a handheld portable device. As an alternative to or in addition to positioning wheel 410 and/or trackball 433, a wide range of one or more pointing or cursor/view positioning mechanisms such as a touch pad, a joystick button, a mouse, a touchscreen, a tablet, or other whether presently known or unknown, may be employed. The cursor may be or include a pointer, a movable item or other visual cue used to mark a position or point to another item on a display, in order to, for example, indicate position for data entry or for selection of the other item.

Keys 428 of keyboard 232 are disposed on a front face of a housing 406 and positioning wheel 410 is disposed at a side of housing 406. Keyboard 232 is in the example form of a reduced QWERTY keyboard including a plurality of keys 428 that serve as input members. It can be seen that the arrangement of the characters 448 on keys 428 of keyboard 424 is generally of the QWERTY arrangement, albeit with many of keys 428 including two of characters 448. In the example depiction of keyboard 424, many of keys 428 include two characters, such as including a first character 452 and a second character 456 assigned thereto. Characters may include letters, digits, symbols and the like and can additionally include ideographic characters, components thereof, and the like. One of keys 428 of keyboard 424 includes as the characters 448 thereof the letters "Q" and "W", and an adjacent key 428 includes as the characters 448 thereof the letters "E" and "R". Keyboard 424 may be of other configurations, such as an AZERTY keyboard, a QWERTZ keyboard, a Dvorak keyboard, or other keyboard or keypad arrangement, and either reduced or not reduced (i.e. full). In a "full" or non-reduced keyboard or keypad arrangement, each key has a single letter (not multiple letters) of the alphabet assigned to it.

Among keys 428 of keyboard 232 are a <NEXT> key 440 and an <ENTER> key 444. The <NEXT> key 440, wherein, for example, "<NEXT>" may be a symbol or may be the word "next" provided (e.g. printed) on the key, may be pressed to provide a selection input to the processor and provides substantially the same selection input as is provided by a rotational input of positioning wheel 410. Since <NEXT> key 440 is provided adjacent a number of other keys 428 of keyboard 232, the user can provide a selection input to the processor substantially without moving the user's hands away from the keyboard 232 during a text entry operation. Another key, the <ESC> key 445 is disposed on the side of housing 406 adjacent positioning wheel 438, although the same or similar key may be disposed as part of keyboard 232. Among keys 428 of the keyboard 424 additionally is a <DEL> key 486 that can be provided to delete a text entry.

Positioning wheel 410 may serve as another input member and is both rotatable, as is indicated by an arrow 412, to provide selection inputs to the processor, and also can be pressed in a direction generally toward housing 406, as is indicated by an arrow 414 to provide another selection input to the processor.

Figure 3:
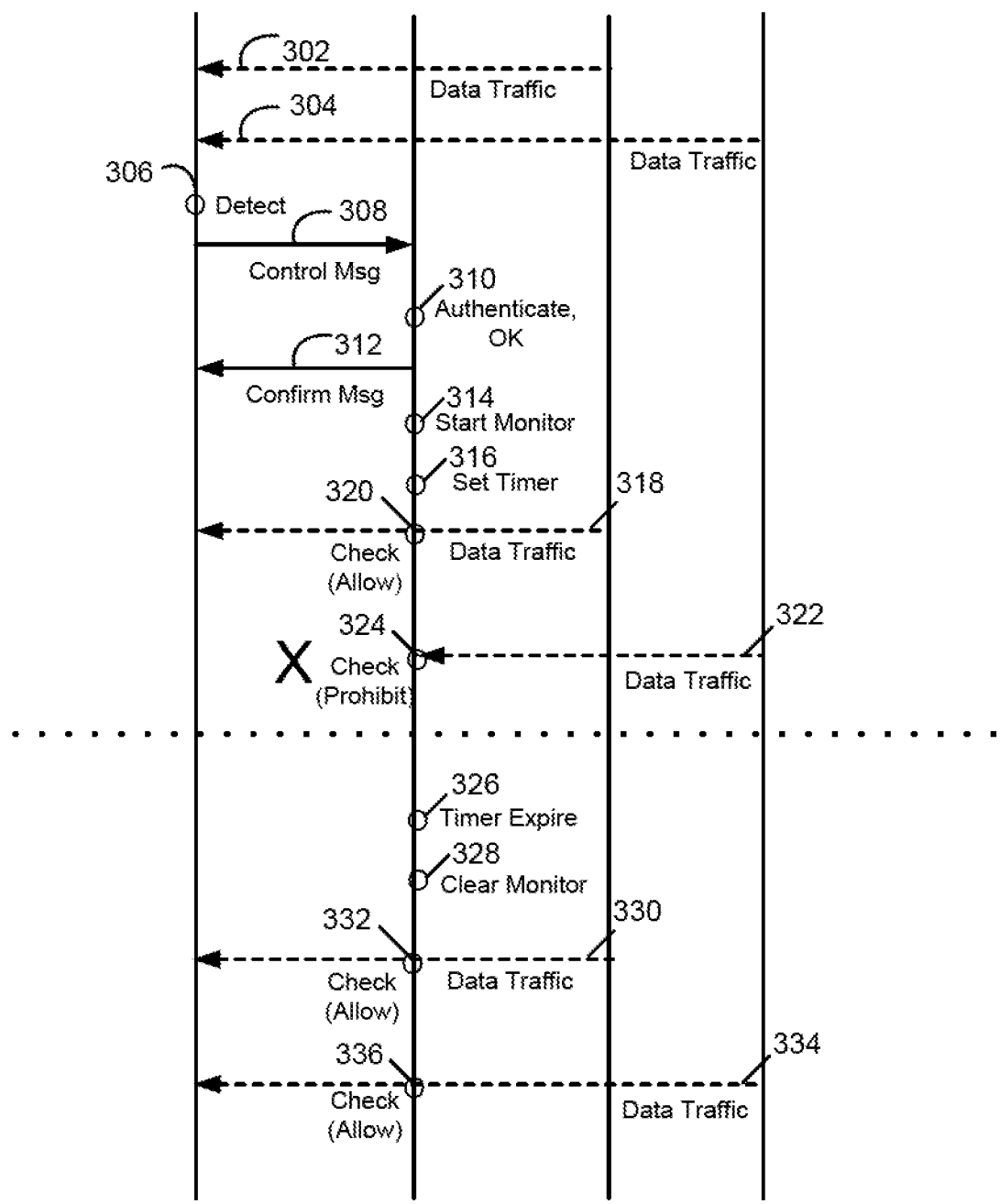
FIG. 3 is a process flow diagram illustrating a technique for use in controlling data traffic for a wireless mobile terminal in the wireless communication network of FIG. 1.

Display 222 may include a cursor 484 that depicts generally where the next input or selection from user interface 402 will be received. Display 222 is shown in FIG. 4 as displaying a home screen that represents a number of applications 586 (FIG. 3 shows some of the example possible applications 86) depicted as corresponding discrete icons 488. Icons 488 include, for example, an Electronic Mail (E-Mail) icon 490, a Calendar icon 492, an Address Book icon 494, a Tasks icon 496, a Messages icon 497, a MemoPad icon 498, and a Search icon 499, respectively.

As shown now further in FIG. 5, memory 224 of the wireless mobile terminal includes a plurality of applications or routines 586 associated with the visually displayed icons 488 of FIG. 4 for the processing of data. Applications 586 may be in any of a variety of forms such as, without limitation, software, firmware, and the like. Applications 586 include, for example, an Electronic Mail (E-Mail) application 588 (FIG. 5) associated with E-mail icon 490 (FIG. 4), a Calendar application 590 (FIG. 5) associated with Calendar icon 492 (FIG. 4), an Address Book application 592 (FIG. 5) associated with Address Book icon 494 (FIG. 4), a Tasks application 594 (FIG. 5) associated with Tasks icon 496 (FIG. 4), a MemoPad (Memos) application 596 (FIG. 5) associated with MemoPad icon 498, a Web Browser application 598 (FIG. 5) associated with Web Browser icon 497 (FIG. 4), a Voice/Telephone application 599 (FIG. 5) associated with Voice/Telephone icon 484, and a Search application 500 (FIG. 5)

associated with Search icon 499 (FIG. 4). An operating system (OS) program 516 also resides in memory 224.

The "home" screen output is shown in FIG. 4 as currently active and constitutes the main "ribbon" application for displaying the icons 488 shown. An application, such as E-mail application 588 of FIG. 5, may then be initiated (opened or viewed) from user interface 402 by providing a suitable user input to it. For example, E-mail application 588 may be initiated (opened or viewed) by rotating positioning wheel 410 to highlight E-mail icon 490 and providing a selection input by translating positioning wheel 410 in the direction indicated by arrow 438. As another example, display 222 displays icon 499 associated with Search application 500 and accepts input from positioning wheel 410 to initiate a search from that icon 499. Applications 586 may be additionally or alternatively initiated (opened or viewed) from user interface 402 by providing another suitable input to it, such as by suitably rotating or "rolling" trackball 433 and providing a selection input by, for example, pushing the trackball 433 (e.g. somewhat similar to positioning wheel 410 except into the plane of FIG. 4).

Movement, navigation, and/or scrolling with use of a cursor/view positioning mechanism is beneficial given the relatively large size of visually displayed information and the compact size of display 222 of FIG. 4, and since information and messages are typically only partially presented in the limited view of display 222 at any given moment. As previously described, positioning wheel 410 is one helpful cursor/view positioning mechanism to achieve such movement. Positioning wheel 410, which may be referred to as a scroll-wheel, specifically includes a circular disc which is rotatable about a fixed axis of housing 302 and may be rotated by the end user's index finger or thumb. When the information or message is being partially displayed, an upwards rotation of positioning wheel 410 causes an upwards scrolling such that display 222 presents viewing of an upper portion of the information or message. Similarly, a downwards rotation of positioning wheel 410 causes a downwards scrolling such that display 222 presents viewing of a lower portion of the information or message. Positioning wheel 410 is mounted along a fixed linear axis such that the end user can depress positioning wheel 410 inwards toward housing 406 (e.g. with the end user's index finger or thumb) for selection of information. Again, see the direction indicated by an arrow 414 of positioning wheel 410 shown.

Although a specific wireless mobile terminal 202 has just been described, any suitable mobile communication device or terminal may be part of the inventive methods and apparatus which will be described in fuller detail below. Note that many components of wireless mobile terminal 202 shown and described may not be included (e.g. a full QWERTY keypad may be optional). Again, keyboard 232 and display 222 may be substituted or enhanced with a touch screen display or other suitable input mechanism, or enhanced or replaced with a voice-activated input module. Also, although the description of the architecture relates to a specific example for illustration, where the WLAN is an IEEE 802.11-based network, different environments may be applicable as well. The wireless network may be a WiMAX-based network (i.e. IEEE 802.16), or an Ultra-WideBand (UWB)-based network (i.e. IEEE 802.15), as a few examples.

Referring back to FIG. 1 briefly, and as described earlier, wireless mobile terminal 202 may remain unprotected against incoming rogue IP data traffic while operating in the WLAN if no suitable technique is employed to control the same. Rogue data traffic may be or include high data rate "pings" with large data packets, denial of service attacks, network misconfiguration, and/or other network errors. Undesired data traffic may be received from server 119 of FIG. 1, which may be deemed a "rogue" device, while desirable data traffic may be received from server 118. Undesired data traffic may cause excessive battery power drain and performance degradation in the wireless mobile terminal 202.

Referring now to FIG. 3, a process flow diagram illustrating a technique for use in controlling data traffic for a wireless mobile terminal in a wireless communication network is shown. In general, the techniques described in relation to the diagram of FIG. 3 may be performed by one or more controllers or processors of a wireless mobile terminal (e.g. wireless mobile terminal 202 of FIGS. 1-2) and an access point (AP) (e.g. AP 116 of FIG. 1) or an AP controller thereof (e.g. AP controller 150). A computer program product which may embody the technique may include a computer readable medium (e.g. memory of the wireless mobile terminal or AP, computer disk, CD-ROM, etc.) having computer instructions stored therein which are executable by the one or more processors for performing the technique.

Wireless mobile terminal 202 receives data traffic communicated from server 118, which is one type of a source device (process step 302 of FIG. 3). Wireless mobile terminal 202 also receives data traffic communicated from server 119 which is another type of source device (process step 304 of FIG. 3). The communication of data traffic in process steps 302 and 304 may occur at the same time, substantially at the same time, or at different times. In this example, data traffic from server 119 may become undesired data traffic, in which server 119 will be deemed a "rogue" device.

Wireless mobile terminal 202 regularly operates to monitor incoming data traffic. In particular, wireless mobile terminal 202 identifies whether a processing requirement for processing the data traffic exceeds a predetermined threshold (process step 306 of FIG. 3). The processing requirement assess may relate to data traffic from server 119, or from both servers 118 and 119, for example. The processing requirement may relate to a buffering requirement in a memory buffer of the wireless mobile terminal 202, a processing speed requirement of a processor of the wireless mobile terminal 202, or both, for example. Alternatively, wireless mobile terminal 202 may identify a condition different from an excessive processing requirement in step 306 (e.g. identifying data traffic that is not excessive but unwanted, unneeded, or having a lower priority that other data traffic).

If an excessive processing requirement or other condition is identified in process step 306, then wireless mobile terminal 202 reads the source IP address of the undesired data traffic from server 119 and stores such address. Wireless mobile terminal 202 then produces a control message and transmits it to AP 116 (process step 308 of FIG. 3. The control message includes the source IP address corresponding to server 119, a destination address corresponding to wireless mobile terminal 202, and a time value indication. The control message is defined to instruct AP 116 (or the AP controller thereof) to prohibit the transmission of the data traffic originating from the source IP address of server 119 and destined to the destination IP address of wireless mobile terminal 202, for a time period indicated by the time value indication.

The time value indication may be an indication of a time period or a time in the future. The time period or time may be chosen "on-the-fly" by the wireless mobile terminal from a range of values depending on the need or circumstance at the wireless mobile terminal. In one example, the selected time period may be a value between 0 and 60 seconds. In another example, the selected time period may be a value between 0 and 5 minutes.

Prior to transmitting the control message, wireless mobile terminal 202 encrypts at least a portion of the control message with use of an encryption key associated with wireless mobile terminal 202 or associated user, or network.

The control message is then received at AP 116, which proceeds to authenticate the message (process step 310 of FIG. 3). During the authentication, AP 116 attempts to decrypt the at least portion of the control message using the encryption key, if known or available. If AP 116 is unable to successfully decrypt the at least portion of the control message, then AP 116 ignores the control message and refrains from performing the further steps.

On the other hand, if AP 116 is able to successfully decrypt the at least portion of the control message, then authentication is successful and the further steps are performed. For one, AP 116 transmits a confirmation message back to wireless mobile terminal 202 (process step 312 of FIG. 3), and this confirmation message is received at wireless mobile terminal 202. In addition, AP 116 adds a new record to a table stored in memory. The stored table is utilized by AP 116 for data traffic monitoring (i.e. prohibiting such data traffic from being transmitted). Each record may include a source IP address, a destination IP address, and a time value indication, for example, for data traffic that is prohibited from being transmitted.

In this case, the new record for wireless mobile terminal 202 includes the source IP address corresponding to server 119, the destination address corresponding to wireless mobile terminal 202, and the time value indication. Thus, in the present example, the table contains a new record corresponding to server 119 from which undesired data traffic is being communicated, but does not contain a record corresponding to server 118 from which desired data traffic is being communicated.

AP 116 then monitors all incoming data packets which are destined for transmission from the AP 116, using the records in the table (process step 314 of FIG. 3). AP 116 also initializes and runs a timer with a time value indicated by the time value indication (process step 316 of FIG. 3).

In the monitoring of process step 314, AP 116 monitors all incoming data traffic for identifying a source IP address that matches the source IP address corresponding to server 119 and a destination IP address that matches the destination IP address corresponding to wireless mobile terminal 202. More particularly, AP 116 reads a current source IP address from a source address field of the data traffic, and a current destination IP address from a destination address field of the data traffic. Then, AP 116 compares the current source IP address with the source IP address from the control message, and the current destination IP address with the destination IP address from the control message. A matching of the source addresses and a matching of the destination addresses will cause the AP 116 to prohibit further transmission.

When AP 116 receives data traffic communicated from server 118 intended for wireless mobile terminal 202 (process step 318 of FIG. 3), AP 116 checks the data traffic (process step 320 of FIG. 3). As the source IP addresses will fail to match, AP 116 will cause this desired data traffic to be transmitted from the AP 116 to wireless mobile terminal 202. When AP 116 receives data traffic communicated from server 119 intended for wireless mobile terminal 202 (process step 322 of FIG. 3), AP 116 will also check this data traffic (process step 324 of FIG. 3). As the source and destination IP addresses will match, AP 116 will prohibit transmission of the undesired data traffic from the AP 116. AP 116 proceeds to discard or delete, from its memory, this undesired data traffic without transmission.

At some time, the timer running in AP 116 will expire (step 326 of FIG. 3). In response, AP 116 deletes the record associated with server 119 from the stored table, and will thereafter allow the data traffic associated with server 119 to be transmitted. Thus, when AP 116 receives data traffic communicated from server 118 intended for wireless mobile terminal 202 (process step 330 of FIG. 3), AP 116 checks the data traffic (process step 332 of FIG. 3). As the source IP addresses will fail to match, AP 116 will cause this data traffic to be transmitted from the AP 116 to wireless mobile terminal 202. Similarly, when AP 116 receives data traffic communicated from server 119 intended for wireless mobile terminal 202 (process step 334 of FIG. 3), AP 116 will also check this data traffic (process step 336 of FIG. 3). As the source and destination IP addresses will fail to match in this case as well, AP 116 will cause this data traffic to be transmitted from the AP 116 to wireless mobile terminal 202.

Note that, in process step 334, wireless mobile terminal 202 may (soon) again identify that data traffic from server 119 is undesirable. In such case, wireless mobile terminal 202 operates to repeat process steps 306, 308, and 312 to again prohibit AP transmission and receipt of such data traffic. This process may repeat over and over, even indefinitely, as needed by wireless mobile terminal 202, especially if the time period provided by wireless mobile terminal 202 is a relatively small value. The processing burden of such repeated control messaging is relatively small.

Alternatively in FIG. 3, the communication of data traffic from server 119 to wireless mobile terminal 202 will cease within the time period provided to the AP 116. In this case, wireless mobile terminal 202 does not need to send any further control messages to AP 116 regarding data traffic from server 119.

As apparent, wireless mobile terminal 202 is advantageously provided with full control over stopping undesirable data traffic, "on-the-fly" as needed. Processing power and battery power consumption in wireless mobile terminal 202 are reduced. Further, RF bandwidth in the WLAN is conserved. The local nature of such processing (i.e. the processing being performed at the AP or controller thereof) is advantageous as it is efficient and expedient. Since an AP or controller thereof already inherently functions to inspect data packets for transmission to wireless mobile terminals, the additional processing needed for the purpose of the present techniques is minimal and efficient. The relatively short time periods provided for the prohibition of such data traffic is also advantageous, as the need to prohibit the data traffic may be short-lived or temporary, and the source of such data traffic may otherwise be a reliable source. The processing burden of repeated control messaging is relatively small in the network.

Thus, techniques for use in controlling data traffic in a wireless local area network (WLAN) which includes at least one access point (AP) have been described. In one illustrative example, a wireless mobile terminal is associated with the AP and receives data traffic from a source device via the AP. The wireless mobile terminal identifies whether a processing requirement for processing data traffic exceeds a predetermined threshold. In response to such identifying, the wireless mobile terminal produces a control message which includes a source address corresponding to the source device and a destination address corresponding to the terminal, and sends the control message to the AP. The control message is defined to instruct the AP to prohibit transmission of the data traffic originating from the source address and destined to the destination address. In one embodiment, the control message also includes a time value indication, for instructing the AP to prohibit transmission of the data traffic for a time period indicated by the time value indication.

A corresponding technique in an AP or controller thereof may also be employed. A control message is received from a wireless mobile terminal at the AP or controller thereof. The control message includes a source address corresponding to a source device and a destination address corresponding to the wireless mobile terminal. In response to receiving the control message, the AP or controller thereof prohibits AP transmission of data traffic which originates from the source address and is destined to the destination address of the wireless mobile terminal. In one embodiment, the control message further includes a time value indication, and the prohibiting of transmission of the data traffic is performed only for a time period indicated by the time value indication, after which the AP or controller thereof causes further data traffic to be transmitted from the AP to the wireless mobile terminal.

In other embodiments, the technique may be employed in any network controller or processor, different from an AP or controller thereof. In such technique, the controller receives a control message from a wireless mobile terminal. The control message includes a destination address corresponding to the wireless mobile terminal, a source address corresponding to a source device, and a time value indication. In response to receiving the control message, the controller prohibits the transmission of the data traffic originating from the source address and destined to the destination address, only for a time period indicated by the time value indication.

The above-described embodiments of the present disclosure are intended to be examples only. Those of skill in the art may affect alterations, modifications and variations to the particular embodiments without departing from the scope of the application. In other environments or embodiments, for example, any controller or processor in the network may be utilized for such control. The invention described herein in the recited claims intends to cover and embrace all suitable changes in technology.

What is claimed is:

1. A method in a wireless mobile terminal for use in controlling data traffic in a wireless local area network (WLAN) which includes at least one an access point (AP), the method comprising:
   receiving, at the wireless mobile terminal, data traffic from a source device via the AP of the WLAN;
   producing, at the wireless mobile terminal, a control message which includes a source address corresponding to the source device and a destination address corresponding to the wireless mobile terminal, the control message being defined to instruct the AP or an AP controller thereof to monitor data traffic to prohibit transmission of the data traffic from the AP or the AP controller that is originating from the source address and destined to the destination address;
   encrypting at least a portion of the control message with use of an encryption key; and
   transmitting, from the wireless mobile terminal, the control message to the AP or the AP controller, so that transmission from the AP or the AP controller is prohibited for data traffic that is originating from the source address and destined to the destination address.

2. The method of claim 1, wherein the control message further includes a time value indication, the control message being further defined to instruct the AP or the AP controller thereof to prohibit the transmission of the data traffic that is originating from the source address and destined to the destination address for a time period indicated by the time value indication, the method further comprising:
   after the time period elapses, again receiving, at the wireless mobile terminal, data traffic from the source device via the AP of the WLAN.

3. The method of claim 1 wherein the act of producing the control message comprises the further act of providing an IP address of the source device as the source address.

4. The method of claim 1, further comprising:
   reading at the wireless mobile terminal a source address of the data traffic identified to have a processing requirement that exceeds a predetermined threshold, and
   producing the control message with the source address read from the data traffic.

5. The method of claim 1,
   wherein the encryption key is associated with the wireless mobile terminal or associated user.

6. The method of claim 1, further comprising:
   during the prohibition of the transmission of the data traffic, receiving, at the wireless mobile terminal via the AP, data traffic from another source device.

7. The method of claim 1, further comprising:
   identifying whether a processing requirement of the wireless mobile terminal for processing data traffic exceeds a predetermined threshold; and
   performing the acts of producing and transmitting in response to identifying that the processing requirement exceeds the predetermined threshold.

8. The method of claim 1, which is embodied as computer instructions stored in a non-transitory computer storage medium for execution by one or more processors of the wireless mobile terminal.

9. A wireless mobile terminal, comprising:
   one or more processors;
   a radio frequency (RF) transceiver module coupled to the one or more processors, the RF transceiver module being configured for communication with an access point (AP) of a wireless local area network (WLAN);
   the one or more processors being configured to:
      receive, via the RF transceiver module, data traffic from a source device via the AP of the WLAN;
      produce a control message which includes a source address corresponding to the source device and a destination address corresponding to the wireless mobile terminal, the control message being defined to instruct the AP or an AP controller thereof to monitor data traffic to prohibit transmission from the AP or the AP controller of the data traffic that is originating from the source address and destined to the destination address;
      encrypt at least a portion of the control message with use of an encryption key; and
      transmit, via the RF transceiver module, the control message to the AP or the AP controller, so that transmission from the AP or the AP controller is prohibited for incoming data traffic that is originating from the source address and destined to the destination address.

10. The wireless mobile terminal of claim 9, wherein the control message further includes a time value indication, the control message being further defined to instruct the AP or the AP controller thereof to prohibit transmission of the data traffic for a time period indicated by the time value indication.

11. The wireless mobile terminal of claim 9, wherein the encryption key is associated with the wireless mobile terminal or associated user.

12. The wireless mobile terminal of claim 9, wherein the one or more processors are further configured to, during the prohibition of the transmission of the data traffic, receive via the AP data traffic from another source device.

13. A method in an access point (AP) or an AP controller thereof for use in controlling data traffic for a wireless mobile terminal operating for communications in a wireless local area network (WLAN), the method comprising:
  receiving, from the wireless mobile terminal, a control message which includes a source address corresponding to a source device and a destination address corresponding to the wireless mobile terminal, at least a portion of the control message encrypted with use of an encryption key;
  in response to receiving the control message,
    monitoring, at the AP or the AP controller, incoming data traffic that is destined for transmission in the WLAN, by comparing a current source address of the incoming data traffic with the source address from the control message, and a current destination address of the incoming data traffic with the destination address from the control message; and
    in response to identifying a match between the current source address and the source address from the control message, and the current destination address and the destination address from the control message, prohibiting transmission from the AP or the AP controller thereof of incoming data traffic that is originating from the source address and destined to the destination address.

14. The method of claim 13, wherein the control message further includes a time value indication, and the act of prohibiting transmission further comprises prohibiting transmission of the incoming data traffic for a time period indicated by the time value indication.

15. The method of claim 13, wherein the encryption key is associated with the wireless mobile terminal or associated user, the method further comprising:
  attempting to decrypt the at least portion of the control message; and
  monitoring the incoming data traffic and prohibiting transmission of the incoming data traffic when the at least portion of the control message is successfully decrypted.

16. The method of claim 13, further comprising:
  during the prohibition of transmission of the incoming data traffic, allowing other data traffic from another source device to be communicated to the wireless mobile terminal.

17. The method of claim 13, which is embodied as computer instructions stored in a non-transitory computer storage medium for execution by one or more processors of the AP or the AP controller thereof.

18. An access point (AP) configured for use in a wireless local area network (WLAN), the AP comprising:
  one or more processors;
  a radio frequency (RF) coupled to the one or more processors;
  the one or more processors being configured to:
    receive, from a wireless mobile terminal, a control message which includes a source address corresponding to a source device and a destination address corresponding to the wireless mobile terminal, at least a portion of the control message encrypted with use of an encryption key; and
  in response to receiving the control message,
    monitor incoming data traffic that is destined for transmission from the AP in the WLAN, by comparing a current source address of the incoming data traffic with the source address from the control message, and a current destination address of the incoming data traffic with the destination address from the control message; and
    in response to identifying a match between the current source address and the source address from the control message, and the current destination address and the destination address from the control message, prohibit transmission from the AP of data traffic that is originating from the source address and destined to the destination address.

19. A method in a wireless mobile terminal for use in controlling data traffic in a wireless local area network (WLAN), the method comprising:
  receiving, at the wireless mobile terminal, data traffic from a source device via an access point (AP) of the WLAN;
  producing, at the wireless mobile terminal, a control message which includes a destination address corresponding to the wireless mobile terminal, a source address corresponding to the source device, and a time value indication, the control message being defined to instruct the AP or an AP controller thereof to monitor data traffic at the AP or an AP controller to prohibit transmission from the AP or the AP controller thereof of data traffic that is originating from the source address and destined to the destination address, for a period indicated by the time value indication;
  encrypting at least a portion of the control message with use of an encryption key; and
  transmitting, from the wireless mobile terminal, the control message to the AP or the AP controller thereof.

20. A method in an access point (AP) controller for use in controlling data traffic in a wireless local area network (WLAN) for a wireless mobile terminal communicating via an AP of the WLAN, the method comprising:
  receiving, at the AP controller from the wireless mobile terminal, a control message which includes a destination address corresponding to the wireless mobile terminal, a source address corresponding to a source device, and a time value indication, at least a portion of the control message encrypted with use of an encryption key; and
  in response to receiving the control message, prohibiting transmission from the AP controller of incoming data traffic that is originating from the source address and destined to the destination address, for a time period indicated by the time value indication.

21. The method of claim 20, wherein the AP controller is operative in accordance with IEEE 802.1.

* * * * *